United States Patent [19]

Sammells

[11] 4,076,905

[45] Feb. 28, 1978

[54] ELECTRODE FOR ELECTRICAL ENERGY STORAGE DEVICE

[75] Inventor: Anthony F. Sammells, Newbury Park, Calif.

[73] Assignee: Rockwell International Corporation, El Segundo, Calif.

[21] Appl. No.: 793,815

[22] Filed: May 5, 1977

[51] Int. Cl.² ............................................. H01M 6/36
[52] U.S. Cl. .................................... 429/112; 429/199; 429/218
[58] Field of Search ............... 75/134 A, 134 S, 134B; 429/112, 218, 103, 199

[56] References Cited

U.S. PATENT DOCUMENTS 3,992,222  11/1976  Walsh et al. .................... 429/112 X

*Primary Examiner*—Charles F. LeFevour
*Attorney, Agent, or Firm*—L. Lee Humphries; Henry Kolin; Clark E. DeLarvin

[57] ABSTRACT

An improved lithium electrode structure comprises an alloy of lithium, silicon, and boron in specified proportions and a supporting current-collecting matrix in intimate contact with said alloy. The lithium electrode of the present invention is utilized as the negative electrode in a rechargeable electrochemical cell.

12 Claims, 5 Drawing Figures

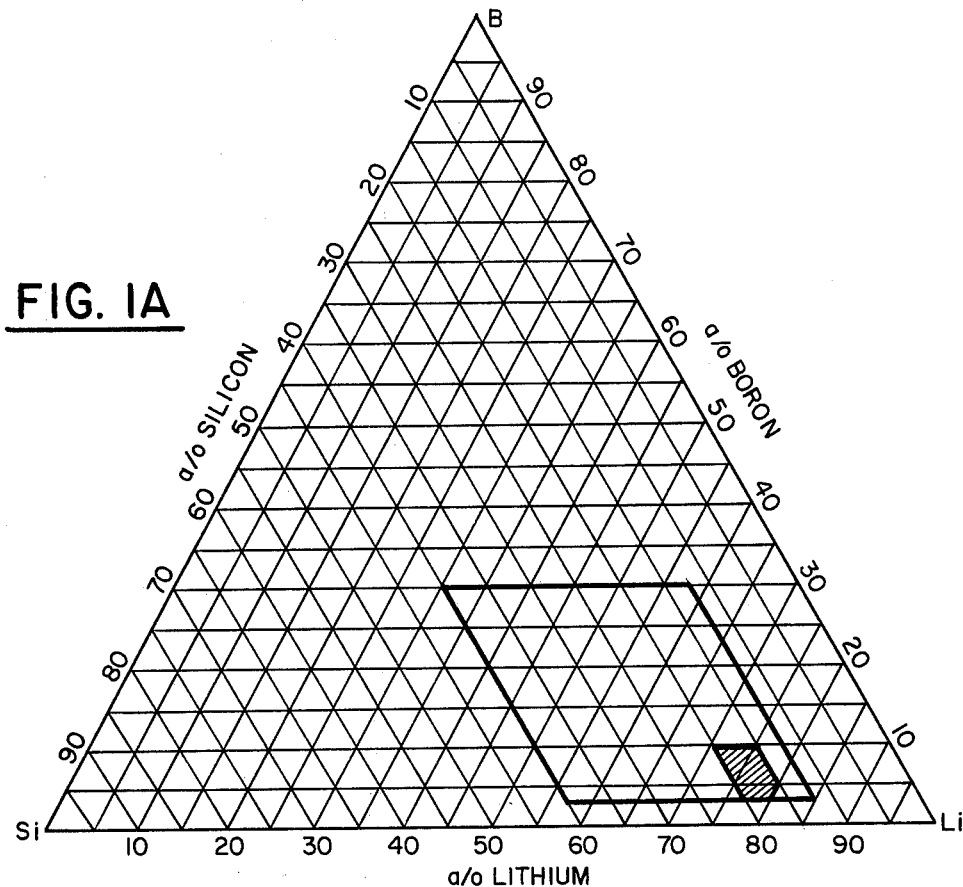
FIG. IA
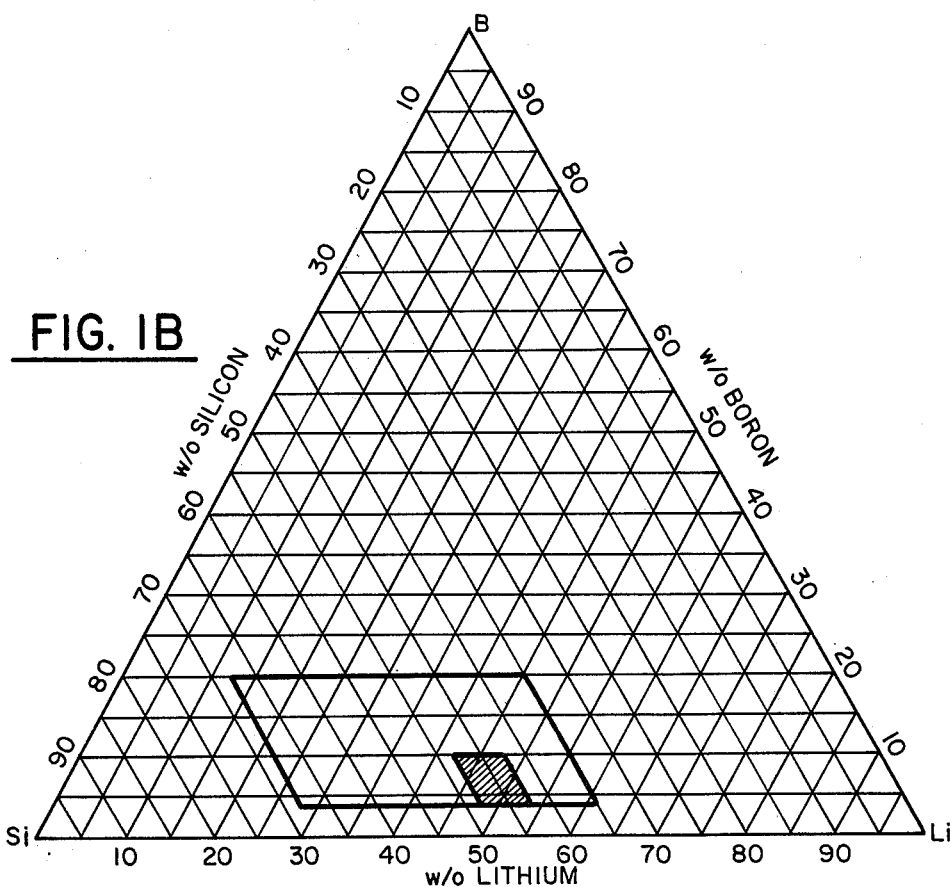
FIG. IB

ELECTRODE FOR ELECTRICAL ENERGY STORAGE DEVICE

BACKGROUND OF THE INVENTION

1. Field of the Invention

The invention broadly relates to electrical energy storage devices and more particularly to a lithium electrode structure and a secondary electrochemical cell utilizing such an electrode.

2. Prior Art

Two approaches generally have been followed in the construction of a lithium electrode for use in an electrical energy storage device, such as a rechargeable battery, particularly one employing a molten salt electrolyte. In one approach, the lithium is alloyed with another metal such as, for example, aluminum to form a solid electrode at the operating temperature of the cell. In the other approach, liquid lithium is retained in a foraminous metal substrate by capillary action. Heretofore, the latter approach has been preferred because it offers higher operating cell voltages and therefore potentially higher battery energy densities. Certain problems are encountered, however, when it is attempted to retain molten lithium in a foraminous metal substrate. More particularly, most metals which are readily wetted by lithium are too soluble in the lithium to permit their use as the metal substrate, whereas most metals structurally resistant to attack by molten lithium are poorly wetted by the lithium when placed in a molten salt electrolyte.

It has been suggested that metals structurally resistant to attack by molten lithium may be wetted by immersion in molten lithium maintained at a hightemperature. However, the structure so wetted by lithium at these higher temperatures usually undergoes progressive dewetting when used as the negative electrode in a secondary battery containing a molten salt electrolyte maintained at the substantially lower temperatures at which such a battery operates. Thus after operation of the battery for a number of cycles, it has been found that lithium no longer preferentially wets the substrate, the electrode progressively losing capacity. Various methods have been proposed in an attempt to overcome this problem. See, for example U.S. Pat. Nos. 3,409,465 and 3,634,144. None of the proposed methods have proven entirely satisfactory.

The use of a solid lithium alloy as taught by the prior art also is not without problems. More particularly, lithium-aluminum alloy, for example, is approximately 300 millivolts more positive than liquid lithium. Thus, electrochemical cells utilizing lithium-aluminum alloys as electrodes are not able to achieve the same potentials as those utilizing liquid lithium electrodes. Further, in a molten salt electrolyte, the lithium-aluminum alloy electrode expands and contracts greatly during charging and discharging of the electrochemical cell. Thus, it has been reported that the lithium-aluminum electrode may change in volume by as much as 200% during charging and discharging of the cell. Still further, lithium-aluminum alloys generally are limited to a lithium content of less than about 30 wt.%.

Various other materials have been suggested for use as an alloy with lithium to form a solid electrode. In U.S. Pat. No. 3,506,490, for example, it is suggested that the lithium be alloyed with either aluminum, indium, tin, lead, silver, or copper. However, none of these materials have been proven to be completely satisfactory. More particularly, these other suggested materials, such as tin and lead for example, form alloys containing lesser amounts of lithium than does aluminum, and thus have a still lower capacity (ampere-hours) per unit weight of alloy. Further, the potential of these other alloys compared with liquid lithium is more positive than that of a lithium-aluminum alloy; thus, alloys of such other materials are less desirable. Other patents relating to solid lithium anodes include U.S. Pat. Nos. 3,506,492 and 3,508,967.

As means of resolving some of the foregoing problems, U.S. Pat. No. 3,969,139 provides an electrode structure utilizing an alloy of lithium and silicon, this electrode being of particular utility as the negative electrode in a rechargeable lithium-metal sulfide molten salt cell. Such an electrode provides excellent lithium retention, significantly reduces corrosion, and provides twice the energy capacity of the lithium-aluminum electrode.

However, it was subsequently found that in electrochemically forming the lithium-silicon alloy electrode, not all the silicon was utilizable in the electrochemical forming process, thereby requiring a greater amount of silicon for a given ampere-hour capacity. Also, when utilized at high current densities, the lithium-silicon alloy electrode tended to become polarized during electrochemical transfer of lithium into and out of the electrode.

Co-pending U.S. patent application Ser. No. 715,358, filed Aug. 18, 1976, now U.S. Pat. No. 4,048,395, and assigned to the Assignee of the present invention, suggests that the foregoing problems are substantially overcome through the use of a ternary alloy of lithium, silicon and iron. The use of a lithium-silicon iron alloy permits substantially complete utilization of the silicon and further reduces the tendency of the electrode to polarize at high current densities. However, another problem has been found with the use of lithium-silicon alloys which is not overcome by the addition thereto of iron. Specifically, it has been found that during cycling of a lithium-silicon electrode that the silicon tends to migrate into the metal substrate supporting structure causing the metal to become brittle, lose its structural integrity and gradually disintegrate into small particles. Accordingly, the need still exists for an improved lithium electrode which retains the advantageous features of the lithium-silicon alloy electrode while at the same time minimizing or eliminating the disadvantageous features thereof.

SUMMARY OF THE INVENTION

Broadly, the present invention provides an improved lithium electrode, compared with the lithium-aluminum, lithium-silicon, and lithium-silicon-iron alloy electrodes, and an electrical energy storage device such as a secondary battery or rechargeable electrochemical cell utilizing such electrode. The improved electrode comprises a ternary alloy of lithium, silicon, and boron in intimate contact with a supporting current-collecting matrix. The formed or fully charged alloy may be represented by the empirical formula $Li_xSiB_y$ where $x$ may have any value from 1 to 5 and $y$ may have any value from 0.1 to 3. For preferred alloy compositions, $x$ has a value from 4 to 5 and B has a value from 0.2 to 1.0, all ranges stated being inclusive.

The ternary alloy electrode may be electrochemically formed starting with a mixture of boron and silicon, substantially complete utilization of the silicon present being obtained during the forming process.

Thereby less silicon will be required to obtain an electrode having a given ampere-hour capacity compared with electrochemical forming when starting with silicon metal alone. In addition, boron substantially inhibits the migration of silicon into the electrode substrate or supporting matrix, thus, the use of boron permits the use of cheaper substrate or matrix materials such as iron and stainless steels without the resulting embrittlement that would occur using lithium-silicon alone or a ternary alloy of lithium-silicon-iron as disclosed in U.S. Ser. No. 715,358 filed Aug. 18, 1976, now U.S. Pat. No. 4,048,395. Another advantage of boron over iron is that the ternary boron alloy occupies less space thus permitting a higher loading of lithium per unit volume. Still further the ternary boron alloys of the present invention are lighter than the ternary iron alloys of the aforesaid patent containing an equivalent amount of lithium. Weight is of particular importance for batteries for use in electric vehicles, thus the present invention is of particular utility for such use.

The presence of boron facilitates the electrochemical utilization of the silicon and substantially reduces the migration of silicon into the electrode substrate. At the same time, however, it is electrochemically inert with respect to the cell process, so it will be appreciated that the amount of boron present in the formed electrode, as well as that of silicon, will be kept to a minimal value consistent with that required for obtaining the improved advantageous features of the present lithium alloy electrode.

The improved electrical energy storage device preferably comprises a rechargeable lithium battery having positive and negative electrodes spaced apart from one another and in contact with a suitable lithium-ion-containing electrolyte, preferably a molten salt electrolyte. The improved lithium electrode of the present invention is utilized as the negative electrode, functioning as the cell anode during the discharge mode of the cell.

BRIEF DESCRIPTION OF THE DRAWING

FIGS. 1A and 1B show on a triangular coordinate scale the Li—Si—B alloy system of the present invention;

DESCRIPTION OF THE PREFERRED EMBODIMENTS

Figure 2:
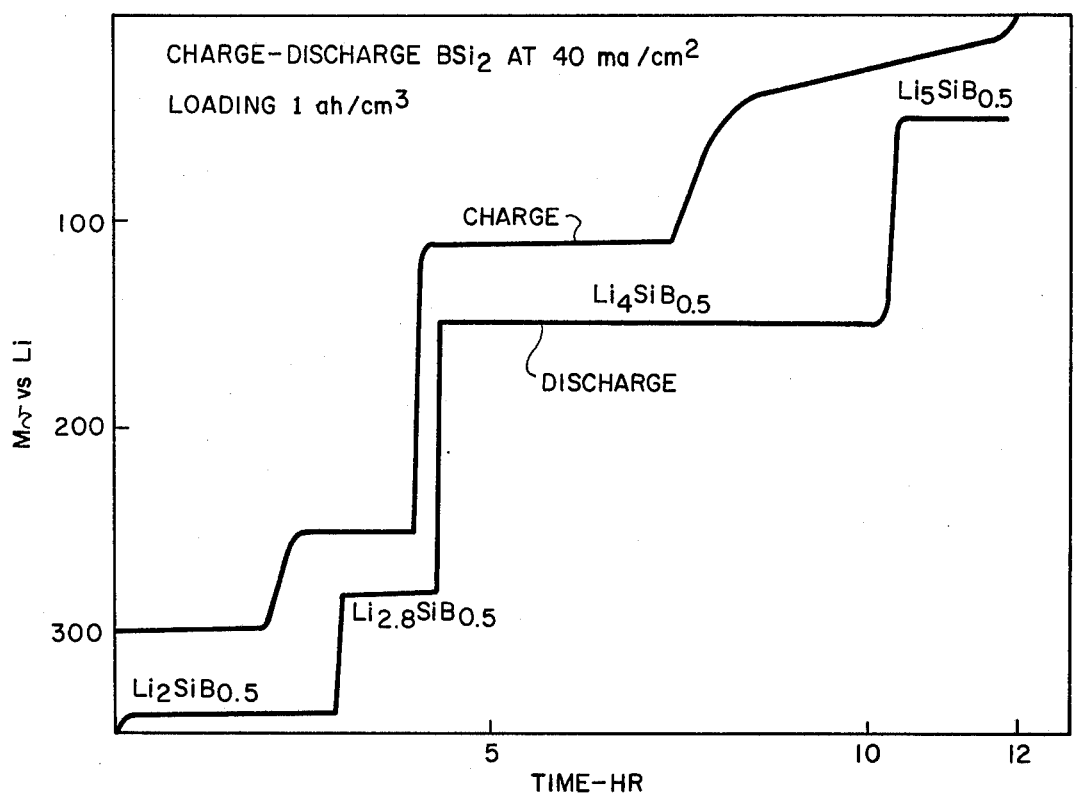
FIG. 2 is a graphical representation of a typical charge-discharge curve characteristic of the electrode of the present invention.

The lithium electrode of the present invention in its broadest aspects comprises a ternary alloy of lithium, silicon, and boron in intimate contact with a supporting current-collecting matrix, thereby generally providing a unitary or composite electrode structure. The term "alloy" as used herein is defined as an intimate mixture of the three metals in which the metals may form mixed crystals, solid solutions, or chemical compounds. The metals also may be present in more than one of these states in the same alloy. For convenience in characterizing and describing the ternary alloy, reference will be made to the composition of the alloy based on weight percentages, atom percentages, and exemplary empirical formulas.

In Table 1 five alloy compositions are shown, based on the empirical formula $Li_xSiB_y$, where $x$ may have any value from 1 to 5 and $y$ may have any value from 0.1 to 3, inclusive, for an electrode in the charged state. For the four preferred alloy compositions shown, $x$ has a value from 4 to 5 and B has a value from 0.1 to 1.0. Also shown in this table are the atom percentages and weight percentages for lithium, silicon, and iron corresponding to the alloy compositions shown.

In Table 2 are summarized the overall composition range and the preferred compositions, both in terms of weight percent and atom percent, for the ternary alloy. Referring to FIG. 1 of the drawing, the enclosed area in the composition diagram of FIG. 1A corresponds to the atom percent range for the ternary alloy compositions shown in Table 2, the preferred ternary alloy range being shown cross-hatched, and corresponding to 70–80 Li, 15–20 Si, and 2–10 B, all in atom percent. Similarly, in FIG. 1B is shown the composition range in terms of weight percent, the preferred composition range being shown cross-hatched and corresponding to 42–56 Li, 42–48 Si, and 2–10 B, all in weight percent. It will be appreciated that the empirical formulas shown and the atom and weight percentages referred to herein refer to the lithium electrode in its formed or fully charged state, since obviously in operation of the cell the lithium will be discharged, resulting in an alloy of substantially less or even no lithium content.

TABLE 1

Li-Si-B COMPOSITIONS

| Empirical Formula | Atom Percent | | | Weight Percent | | |
|---|---|---|---|---|---|---|
| | Li | Si | B | Li | Si | B |
| LiSiB | 40 | 40 | 20 | 17.3 | 69.3 | 13.4 |
| $Li_2Si_{0.5}B_{1.32}$ | 52.4 | 13.1 | 34.6 | 31.1 | 33.1 | 33.8 |
| $Li_2SiB_{0.5}$ | 57.1 | 28.6 | 14.3 | 29.5 | 59.1 | 11.4 |
| $Li_4SiB_{0.5}$ | 72.7 | 18.2 | 9.1 | 45.6 | 45.6 | 8.8 |
| $Li_5SiB_{0.5}$ | 76.9 | 15.4 | 7.7 | 51.1 | 40.9 | 8.0 |
| $Li_5SiB_{0.1}$ | 82.0 | 16.4 | 1.6 | 54.6 | 43.7 | 1.7 |

TABLE 2

SUMMARY OF Li-Si-B COMPOSITION RANGES

| | Atom Percent | | | Weight Percent | | |
|---|---|---|---|---|---|---|
| | Li | Si | B | Li | Si | B |
| Overall Range: | 30–85 | 12–40 | 3–30 | 12–61 | 35–68 | 4–20 |
| Preferred Range: | 70–80 | 15–20 | 2–10 | 42–56 | 42–48 | 2–10 |

For certain special applications, depending particularly on the temperature of use and the nature of the electrolyte with which the electrode will be in contact, it is contemplated that the lithium alloy electrode may be self-supporting. However, for most applications, particularly where the lithium alloy electrode is in contact with a molten salt electrolyte at elevated temperatures, the lithium-alloy electrode structure further includes a supporting current-collecting matrix in intimate contact with the alloy.

Suitable materials for the supporting current-collecting matrix are those materials resistant to attack by lithium or lithium-silicon-boron mixtures. Examples of such materials include iron, steel, stainless steel, molybdenum, titanium, tantalum, and zirconium. The purpose of providing a matrix in intimate contact with the alloy is to provide for substantially uniform current density throughout the alloy and also to provide structural support for the alloy. It has been determined that the lithium-silicon-boron alloy utilized in the present invention generally lacks structural integrity when used in an electrical energy storage device as the sole component of the negative electrode, particularly in a molten salt electrolyte at its high operating temperature. To function for any significant length of time without disintegration, therefore, it is preferable if not actually essential that the lithium alloy be provided with a supporting matrix. It is contemplated and preferred, within the scope of this invention, that the support and current-collecting capability be provided by a single structure; however, the support may be provided by one structure and the current-collecting capability by another separate structure.

The matrix may be in the form of an electronically conductive porous substrate having an apparent density of from about 10 to 30 percent of that of the base material. Advantageously, the substrate will have a median pore size within the range of from about 20 to 500 microns and preferably from about 50 to 200 microns. A preferred form of such a substrate is formed from woven or non-woven wires pressed together to a desired apparent density and then sintered. Such pressed and sintered wire structures are known and commercially available as Feltmetals. The porous substrate then is impregnated with the alloy, for example, by immersion in a molten bath of the alloy followed by removal and cooling. Alternatively, the alloy may be cast about a matrix formed from a wire or screen or expanded metal.

In another variation, the matrix structure may be in the form of a perforate container formed from wire screen or the like, and containing therein a body of the alloy alone. Alternatively, the alloy is in intimate contact with a porous substrate enclosed in the perforate container, it being desirable that the container and the substrate be in electrical contact with one another. This latter variation is particularly useful when the porous substrate is formed from very fine woven or non-woven wires pressed together to form a body.

More particularly, it has been found, at least in the case of iron used as the substrate material, that if the wire used to form the porous substrate has a diameter of less than about 10 microns, the substrate tends to break up and disintegrate upon repeated charging and discharging of the electrode in a molten salt electroylte. It is not known with certainty whether such destruction is the result of imperceptible expansion and contraction of the electrode or the occurrence of a chemical interaction. In selecting material for use as a substrate, therefore, consideration should be given to any chemical reaction or corrosion that may occur as a result of the specific electrolyte or matrix material which is utilized. Further, if the matrix comprises woven or non-woven wires pressed together to provide a porous substrate, the wire should have a diameter of at least about 10 microns. Advantageously, the wire diameter will be from about 10 to about 500 microns and preferably from about 10 to 200 microns.

A particularly suitable supporting current-collecting matrix electrode structure that may be utilized in the present invention is shown in U.S. Pat. No. 4,003,753, assigned to the Assignee of the present invention, said patent being hereby incorporated by reference. Broadly, this matrix structure comprises a unitary multi-cell structure including a plurality of wall members having edges and axially extending surfaces which form a plurality of cells having at least one open end, said cells having a cross-sectional area of at least about 0.04 cm$^2$. The edges of the wall members in the open end of the cells are aligned in a common plane to form a planar face. Generally the electrode structure will have a planar face having a surface area of from about 25 to 300 cm$^2$. The axially extending surfaces of the wall members are substantially perpendicular to the planar face. The body of electrochemically active alloy material is disposed in the cells, being retained in place by an electrolyte-permeable member which is affixed to the wall members and covers the open end of the cells. This type of matrix electrode structure may also be utilized for containing a body of electrochemically active positive electrode material.

The multi-cell matrix structure is essentially a macroporous or open-faced cellular structure. The individual cells may take various forms, however, such as squares, diamond shapes, rectangular, circular, octagonal, or indeed just about any geometric shape. Further, the individual cells may or may not share a common wall. The particularly preferred form is one in which the individual cells are hexagonal in shape, sharing a common wall to form a honeycomb structure. This preferred shape optimizes the void volume for retention of active material while at the same time providing a high strength-to-weight ratio. In some instances, however, other less complex forms such as square-shaped cells may be preferred for economic reasons. An advantage of this matrix structure over the prior art porous matrix structures is the ease with which it can be uniformly loaded with active materials.

The cell depth of the multi-cell structure is not particularly critical. Generally, it has been found that good utilization of the electrochemically active positive or negative electrode material is attainable with cells having a depth of from about 0.1 to 2.0 cm and preferably from about 0.5 to 1.0 cm. It will be appreciated, however, that the depth of the cell and thickness of the wall members of the mutli-cell structure should be such as to provide structural integrity and resist warping. Particularly good results have been obtained with respect to effective utilization of active material and structural integrity when the ratio of the open cross-sectional area of the cell to the depth of the cell is maintained within a range of from about 1:1 to 2:1 and the wall members of the cell have a thickness within the range of from about 0.002 to 0.05 cm, preferably from about 0.002 to about 0.02 cm.

The particular material selected for the electrode structure of the present invention is not critical except insofar as it must be one which is not attacked or corroded by the molten electrolyte during normal operation of the device. Generally, iron, steel, or nickel steel alloys are preferred on the basis of cost for containing the LI—Si—B alloy material. Molybdenum, titanium, and tantalum are preferred on the basis of their corrosion resistance, however, the cost of these metals are generallly prohibitive.

The electrolyte-permeable member may be conductive or non-conductive and fills two functions: (1) to permit free passage of charged ions and electrolyte into and out of the cells, and (2) to retain the active material in the cell. It has been found that the structural integrity of this matrix electrode structure is greatly enhanced when the electrolyte-permeable member is fixedly attached to the wall members, preferably at the edges of the wall members, for example, by welding, brazing, or diffusion bonding.

In a particularly preferred embodiment, the electrolyte-permeable member is formed from a wire screen wherein the individual wires have a diameter of from about 0.002 to 0.02 cm, the opening in the electrolyte-permeable member should have a cross-sectional area within the range of from about $1 \times 10^{-6}$ to $1 \times 10^{-3}$ cm$^2$, and there should be provided from about $10^5$ to $10^2$ openings per square centimeter. The electrolyte-permeable member preferably is made from the same material as the wall members. In addition to screens, other forms which may be used are porous sintered plaques, perforate plates, and the like. While the wire screen is applicable to both positive and negative electrode structures because of its low cost, these other forms also may be used. When a porous plaque such as porous nickel, iron or the like is used, it should have an apparent density of from about 20 to b 60% of that of the base metal and an average pore size of from about 1 to 20 microns.

In one embodiment of the invention, the electrode is formed by surrounding the matrix with the alloy in a molten state, for example, by immersing a porous substrate in a molten body of the ternary alloy. The alloy may be formed by mixing particulate lithium, silicon, and iron and heating such a mixture to a sufficiently elevated temperature to form a melt. In accordance with a preferred method however, the lithium first is heated, in an inert atmosphere, to a temperature above the melting point of lithium, and thereafter an boron silicide, typically a borosilicon, is added in an amount to provide the desired weight percent for the ternary alloy. In such latter method, the exothermic reaction between the lithium and the borosilicon will provide substantially all of the heat required to form a melt of the alloy.

It is particularly advantageous and preferred that the present lithium alloy electrode be formed electrochemically in a molten salt electrolyte in generally the same manner as known and utilized in forming lithium-aluminum and lithium-silicon electrodes. See, for example, U.S. Pat. No. 3,947,291. In the present invention, assembling a cell with at least the negative electrode, and preferably both electrodes, in the "uncharged" state is particularly desirable because of the substantially complete utilization of silicon obtained. Specifically, borosilicon in intimate contact with the supporting current-collecting matrix and a mixture of lithium sulfide and iron as uncharged positive electrode are immersed in a molten salt electrolyte containing a source of lithium ions, and the lithium is coulometrically charged into the electrode in an amount to form the desired alloy. At the same time iron sulfide is being formed as the positive electrode.

The boron silicides may contain minor amounts of impurities such as, for example, calcium, magnesium, chromium, cerium, manganese, aluminum, carbon, and zirconium.

It is not clear from a theoretical basis why boron is able to form a suitable ternary alloy with lithium, achieving high utilization of silicon, compared for example with molybdenum silicide which does not form a suitable lithium alloy. Although applicant does not wish to be limited in this regard to the following proffered explanation, it is believed that because of the weaker bonding between the boron and silicon linkages there is a negative free energy of formation of the lithium compound, thereby promoting the reaction. The reduced migration of silicon into the substrate or supporting matrix of the electrode is believed to be inhibited by a reaction between the boron, silicon and substrate metal which forms a protective boron-silicon-metal compound coating on the exposed surfaces of the substrate. The protection could, of course, be provided by depositing a film of boron on the substrate prior to loading the substrate with lithium and silicon. Reliably obtaining a uniform coating or film of boron on the substrate is difficult, however, particularly when the substrate has a complex configuration. Further, to be assured that all of the surface of the substrate is covered it is necessary to apply a relatively thick coating of boron which results in an undesirable increase in resistance and cost since boron is expensive and in elemental form is a poor conductor. Accordingly it is preferred to provide the boron in the form of the previously described ternary alloy. Nonetheless a thin coating of boron on the substrate in addition to the ternary alloy is a desirable option.

The present invention also provides an electrical energy storage device, particularly a secondary cell or battery, which includes the lithium electrode of the present invention as the electrically regenerable negative electrode, a positive electrode, and an electrolyte.

The positive electrode or cathode is an electron acceptor and contains an active material which is electropositive with respect to the lithium electrode. The active material of the cathode may be sulfur or a metal halide, sulfide, oxide or selenide. Suitable metals include copper, iron, tungsten, chromium, molybdenum, titanium, nickel, cobalt, and tantalum. The sulfides of iron are particularly preferred for use with molten salt electrolytes. The cathode may be formed entirely of the active material or may comprise a composite structure such as a holder of, for example, graphite containing a body of such active material, or the multi-cell matrix electrode structure previously described.

The electrolyte utilized in preferred cell embodiments is a lithium-ion-containing molten salt electrolyte; alternatively, for certain particular cell systems, a solid electrolyte, an organic solvent electrolyte or an aqueous electrolyte is utilizable.

The term "molten salt electrolyte" as used herein refers to a lithium halide-containing salt which is maintained at a temperature above its melting point during operation of the electrical energy storage device. The molten salt may be either a single lithium halide, a mixture of lithium halide, or a eutectic mixture of one or more lithium halides and other alkai metal or alkaline earth metal halides.

Typical examples of binary eutectic salts are lithium chloride-potassium chloride, lithium chloride-magnesium chloride, lithium chloride-sodium chloride, lithium bromide-potassium bromide, lithium fluoride-rubidium fluoride, lithium iodide-potassium iodide, and mixtures thereof. Two preferred binary salt eutectic mixtures are those of lithium chloride and potassium chloride (melting point 352° C), and lithium bromide and rubidium bromide (melting point 278° C).

Examples of ternary eutectics useful as the molten salt electrolyte include calcium chloride-lithium chloride-potassium chloride, lithium chloride-potassium chloride-barium chloride, calcium chloride-lithium chloride-barium chloride, and lithium bromide-barium bromide-lithium chloride. Preferred tenary eutectic mixtures include those containing lithium-chloride, lithium fluoride and lithium iodide (melting point 341° C) and lithiumchloride, lithium iodide and potassium iodide (melting point 260° C).

The suitable alkali or alkaline earth metal ion should have a deposition potential very close to or preferably exceeding deposition potentials of lithium ion in the electrolyte. Lithium halide salts can be readily combined with halides of potassium, barium, and strontium. Halides of metals such as cesium, rubidium, calcium, or sodium may be used, but a substantial proportion of these metals may be co-deposited with the lithium when the electrode is charged, with a resulting small loss in potential.

Although the ternary eutectic salt mixtures, particularly those containing the iodides, provide lower melting points, the binary eutectic mixture of lithium chloride-potassium chloride sometimes is preferred on the basis of its lower cost and availability, particularly for batteries to be used in large scale applications such as electric powered vehicles and electric utility bulk energy storage.

If desired, a lithium chalcogenide corresponding to the chalcogenide of the positive electrode is added to the molten salt. Thus, when the positive electrode material is a sulfide or oxide, $Li_2S$ or $Li_2O$ is added, respectively, to the molten salt. It has been found that if a saturating amount of the lithium sulfide (about 0.1 wt.%) or lithium oxide (about 0.4 wt.%) is added to the fusible salt electrolyte, long-term cell performance is enhanced.

The solid state electrolytes contemplated herein include a mixture of lithium sulfate and a lithium halide such as lithium chloride or lithium bromide or a mixture thereof. The composition of the mixed salt solid electrolyte may vary from 10 to 95 mole % lithium sulfate. Solid electrolytes having such composition are conductive in what appears to be a solid phase at temperatures as low as about 400° C.

The lithium electrode of the present invention also is useful in electrical energy storage devices, particularly primary cells, which utilize a lithium-ion source in an organic solvent. The term "organic electrolyte" contemplates those non-aqueous electrolytes which comprise an organic solvent and a solute. The solute is the source of lithium cations. The solute also is, of course, miscible or dissolved in the organic solvent. The solvent is such that it does not attack the electrode materials and is not affected by them. Obviously the solute should be stable in its environment at the intended operating temperature and electrical potential. Organic electrolyte cells generally are designed to operate at a temperatue below about 125° C, and more specifically, at a temperature within the range of from about 0° to 80° C. It is important that the solute and the solvent be such as to provide a lithium ion-containing and conducting medium which is mobile or liquid under these conditions. Normally, it is preferred that the solute be of high purity.

The solutes which most nearly meet these requirements are lithium halide salts. For conductivity purposes, other metal halides, e.g., aluminum chloride, are often complexed with the lithium halide. The halide is selected from the group consisting of chlorine, fluorine, bromine, iodine, and mixtures thereof. It is envisioned that double anion complexes also could be used. Examples of suitable solutes are lithium bromide, lithium chloride, lithium fluoride, sodium chloride, sodium fluoride, and potassium chloride. The lithium salt also may be a lithium perchlorate, hexafluophosphate, tetrafluoborate, tetrachloroaluminate, or hexafluoarsenate.

Preferably, the lithium ion-containing and conducting medium used is in a saturated or supersaturated condition. The ion-containing and conducting medium should have sufficient salt concentration to permit most economical operation of the cell. The ion-containing and conducting medium should have a concentration of solutes greater than about 0.5 molar.

The choice of organic solvent for the ion-containing and conducting medium is dictated by many of the considerations involving the solute. The solvent of the ion-containing and conducting medium is any polar material which meets the requirements of serving as a transfer medium for the solute and in which the solute is miscible or dissolved. The solvent also should be of such a material as to be inert to the electrode materials. The solvent is preferably a liquid at from about 0°–125° C; operating conditions dictate such a requirement. For example, dimethylsulfoxide is an excellent solvent about its melting point of about 18.5° C. the solvent is desirably one which does not readily release hydrogen ions. Solvents of high dielectric constants and low viscosity coefficients are preferred.

Suitable solvents are, for example, the nitriles such as acetonitrile, propionitrile, sulfoxides such as dimethyl-, diethyl-, ethylmethyl-, and benzylmethylsulfoxide; pyrrolidones such as N-methylpyrrolidone, and carbonates such as propylene carbonate.

The anodic reaction of alkali metals in aqueous electrolytes in an electrochemical cell to produce electrical energy is also known. Of particular interest is a high-energy lithium-water primary cell, which utilizes a lithium or lithium alloy anode, an inert cathode such as platinum, nickel, or silver oxide, and an aqueous alkali metal hydroxide electrolyte, such as sodium hydroxide or potassium hydroxide. The lithium alloy electrode of the present invention is considered as suitable for use as an anode in such as lithium-water primary cell system.

In addition to the foregoing representative list of suitable electrolytes and positive electrode materials, many others will be apparent to those versed in the art. It is not intended that the invention be limited, therefore, only to those specifically identified.

Referring now to FIG. 2 of the drawing, there is shown a graphical comparison of a typical charge-discharge curve for a Li—Si—B alloy electrode. As may be noted from FIG. 2, the Li—Si—B electrode charges and discharges through four distinct voltage plateaus, the final plateau of about 48 mv being below the potential of liquid lithium. This charge-discharge curve is substantially the same as that for a lithium-silicon alloy, thus, it is seen that the addition of boron has no deleterious effect on the electrical performance of the alloy.

The reason for such a series of different potentials with lithium-silicon or lithium-silicon-boron alloys is not known with certainty, and the present invention is not to be considered as limited by any particular theory. It is believed, however, that the different plateaus represent specific species of lithium alloy compounds. Obviously, knowledge of the precise mechanism involved is not necessary for the practice of the present invention.

Referring to FIG. 2, it also will be noted that the alloy is formed to a potential which is below that of liquid lithium. At the liquid lithium potential, it is possible that the release of free lithium into the electrolyte may occur. However, it should be noted that even where it is desired to completely eliminate such a possibility by electroforming to a lower plateau than that of liquid lithium, in all instances the percent utilization of silicon for the Li—Si—B alloy is usually significantly greater at equivalent plateaus than for a Li—Si alloy. Also, to guard against the possibility of free lithium being present, the Li—Si—B alloy having a lower lithium atom percent may be formed such as that corresponding to $Li_4SiB_{0.5}$ (atom % Li is 72.7) rather than $Li_5SiB_{0.1}$ (81.6 atom % Li).

Figure 3:
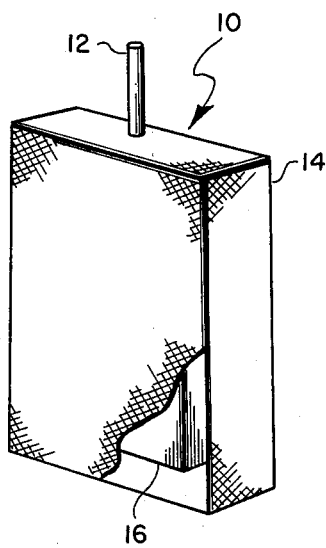
FIG. 3 is a pictorial view in perspective of an electrode of the present invention.

Referring now to FIG. 3, a lithium electrode 10 of the present invention is shown. The electrode 10 includes a conductor wire 12 and a cage or a perforate container matrix formed from a wire screen 14 and a porous substrate impregnated with a lithium-silicon-boron alloy 16. Alternatively, the multi-cell honeycomb structure shown in U.S. Pat. No. 4,003,753 may be used as the matrix structure.

Figure 4:
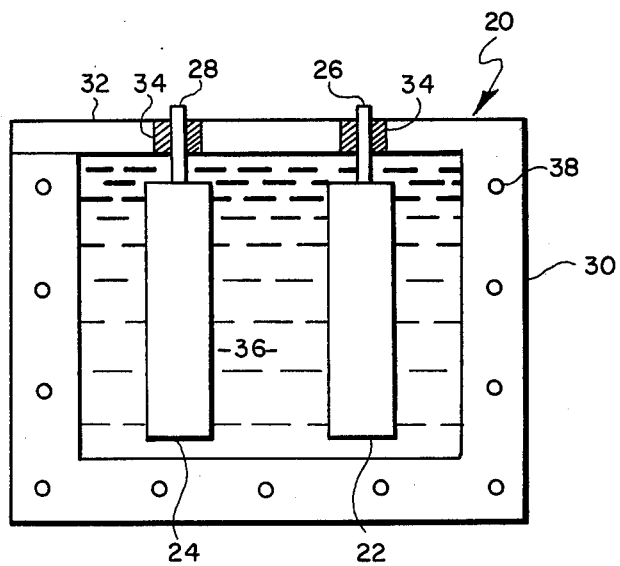
FIG. 4 is a diagrammatic representation of an electrical energy storage device of the present invention.

In FIG. 4 is depicted an electrical energy storage device 20 which utilizes the lithium alloy electrode of the present invention. The storage device 20 includes a positive electrode 22 and a negative electrode 24, the latter comprising a porous metal substrate impregnated with a lithium-silicon-boron alloy. Electrodes 22 and 24 are provided with electrical connectors 26 and 28, respectively. The electrical energy storage device also includes a housing 30 and a cover 32. The cover 32 is provided with apertures therethrough for electrical connectors 26 and 28. Located within the apertures are electrically nonconductive insulators 34. The electrical energy storage device also includes an electrolyte 36. When the electrolyte is a solid electrolyte or a molten salt electrolyte, both of which must operate at relatively high temperatures, housing 30 also may be provided with heating means such as a plurality of electrical resistance heaters 38.

The following examples are set forth for the purpose of illustrating the present invention in greater detail, but are not to be considered as limitations thereof. Thus the examples principally relate to use of the electrode of the present invention in a molten salt electrolyte which is preferred. However, the invention should not be construed as limited to electrical energy storage devices utilizing only a molten salt electrolyte, for, as herein disclosed, it will also have utility in an electrical energy storage device utilizing either a solid electrolyte, an organic electrolyte, or an aqueous electrolyte.

EXAMPLE 1

To demonstrate that the lithium-silicon-boron alloy of the present invention has utility as an electrode and further that the addition of the boron permits the forming of a negative electrode from a discharged state, the following tests were performed. Five electrodes were assembled using a five square centimeter piece of low carbon steel honeycomb. The electrodes were individually tested by immersing them in a lithium chloride-potassium chloride eutectic molten salt electrolyte having a melting point of about 352° C. The electrodes were then cycled against a lithium counter electrode. The results of the test are set forth in Table 3. The utility of the presently claimed invention is seen in Table 3. Specifically, electrodes one and three were readily charged to in excess of 90% of the theoretical ampere-hour capacity. In addition, no significant polarization of the electrodes were observed until the current density was increased to about 60 mA/cm² (electrode #5). Thus this example clearly demonstrates the utility of the ternary lithium-silicon-boron alloy for use as a negative electrode in a molten salt electrolyte.

EXAMPLE 2

This example is set forth to demonstrate the decrease in silicon migration into an electrode supporting structure when using a lithium-boron-silicon alloy. One pair of test electrodes was made using an AISI 1010 steel honeycomb for the supporting structure or matrix. One electrode was filled with lithium-silicon-iron and the other with lithium-silicon-boron. The two electrodes were then cycled against a lithium counter electrode for 340 hours at a temperature of 450° to 470° C. At the end of the test the electrodes were removed and subjected to analysis to determine the extent of silicon migration into the substrate. The scale thickness (silicon migration depth) was two to three times greater on the lithium-silicon-iron electrode than on the lithium-silicon-boron electrode. The substrate used for the lithium-silicon-boron alloy was found to have a scale containing significantly increased amounts of boron, thus demonstrating that the boron plays a significant role in preventing the formation of $Fe_3Si$ at the substrate surface. When this test is repeated comparing lithium-silicon to the alloy of the present invention, the silicon migration depth is 6 to 12 times greater on the lithium-silicon substrate.

TABLE 3

| Electrode No. | Electrolyte Temperature (° C) | Theoretical Capacity (A hr/cc) | Current Density (mA/cm²) | Utilization Percent of Theoretical Capacity | Cycled Between |
|---|---|---|---|---|---|
| 1* | 425 | 1.95 | 10 | 96.9 | $SiB_{0.5} \longleftrightarrow Li_5SiB_{0.5}$ |
| 2 | 425 | 1.95 | 40 | 93 | $SiB_{0.5} \longleftrightarrow Li_5SiB_{0.5}$ |
| 3* | 425 | 1.0 | 40 | 99 | $SiB_{0.5} \longleftrightarrow Li_5SiB_{0.5}$ |
| 4 | 366 | 0.8 | 20 | 82 | $SiB_{0.5} \longleftrightarrow Li_4SiB_{0.5}$ |
| 5 | 366 | 0.8 | 60 | 57 | $SiB_{0.5} \longleftrightarrow Li_4SiB_{0.5}$ |

*Formed from uncharged state, i.e. $SiB_{0.5}$

A similar test was performed using a pair of electrodes which utilized a stainless steel honeycomb as the supporting structure. In this test the electrodes were cycled for 1500 hours at a temperature of 425° to 450° C. Following this test the electrodes were subjected to analysis for scale thickness (silicon migration). The electrode substrate which had been filled with lithium-silicon-iron had a scale thickness 30 to 40% greater than that of the supporting structure which had been filled with the alloy of the present invention. Thus these tests clearly demonstrate the efficacy of the alloy of the present invention for supressing silicon migration into the supporting structure of an electrode.

As may be noted from the foregoing examples, the present invention is particularly advantageous in offering the ability to assemble a complete cell with both the negative and positive electrodes initially in the uncharged state and then electroforming in situ. Because of the lesser sensitivity to oxygen and moisture of the uncharged electrodes in the absence of lithium, ease of handling, charging, and fabrication is greatly facilitated. By contrast, starting with an initially discharged condition and forming lithium-silicon negative electrodes by electrochemically charging silicon powder is disadvantageous, since it has been found difficult to utilize more than half of the silicon powder present in the electrode structure.

It will of course be realized that various modifications can be made in the design and operation of the lithium electrode and cell of the present invention without departing from the spirit thereof. Thus, while the lithium electrode structure has been illustrated and described with respect to certain exemplary embodiments relating to particular preferred constructions and materials for the supporting current-conducting matrix electrode structure, and while preferred embodiments of secondary cells utilizing molten salt electrolytes and metal sulfide cathodes have been illustrated and described, it should be understood that within the scope of the appended claims the invention may be practiced otherwise than as specifically illustrated and described.

What is claimed is:

1. An electrical energy storage device having positive and negative electrodes spaced from one another and in contact with a lithium-containing electrolyte, wherein the negative electrode is a composite electrode structure which comprises an alloy of lithium, silicon, and boron having the empirical formula $Li_xSiB_y$, where $x$ has a value from 1 to 5 and $y$ has a value from 0.1 to 3, and wherein a current-collecting matrix supporting said alloy is in intimate contact therewith.

2. The electrical energy storage device of claim 1, wherein $x$ has a value from 4 to 5 and $y$ has a value from 0.2 to 1.

3. The electrical energy storage device of claim 1, wherein said positive electrode contains a metal sulfide as the active material.

4. The electrical energy storage device of claim 1, wherein said electrolyte is a lithium-containing salt which is molten at the operating temperature of the device.

5. The electrical energy storage device of claim 1, wherein $x$ a value from 4 to 5 and $y$ has a value from 0.2 to 1, the positive electrode contains iron sulfide as its active material, and the lithium-containing electrolyte comprises a eutectic salt mixture of a lithium halide and at least one other alkali metal halide, said salt mixture being molten at the operating temperature of the device.

6. The electrical energy storage device of claim 4, wherein said lithium-containing electrolyte comprises a eutectic mixture of lithium halide and at least one other alkali metal halide.

7. A composite negative lithium electrode structure for an electrical energy storage device wherein said composite electrode structure comprises:
an alloy of lithium, silicon, and boron having the empirical formula $Li_xSiB_y$, where $x$ has a value from 1 to 5 and $y$ has a value from 0.1 to 3, and
a current-collecting matrix supporting said alloy and in intimate contact therewith.

8. The electrode structure of claim 1, wherein $x$ has a value from 4 to 5 and $y$ has a value from 0.2 to 1.0.

9. The electrode structure of claim 1, wherein the supporting current-collecting matrix comprises a cellular metal substrate impregnated with said alloy.

10. The electrode structure of claim 1, wherein the supporting current-collecting matrix comprises a unitary multi-cell structure, including:
a plurality of wall members having edges and axially extending surfaces which form a plurality of cells having at least one open end and a cell cross-sectional open area of at least about 0.04 cm$^2$, said edges of said wall members and the open end of said cells being aligned in a common plane to form a planar surface, the axially extending surfaces of said wall members being substantially perpendicular to said planar surface;
said alloy being disposed in said cells; and
an electrolyte-permeable member affixed to said wall members and covering the open end of said cells for retaining said alloy in said cells.

11. The electrode structure of claim 10, wherein said wall members are of metal and form a plurality of hexagonal cells, and said electrolyte-permeable member is a metal screen bonded to the edges of said wall members.

12. The electrode structure of claim 11 wherein said metal is selected from nickel, iron, steel, tantalum, and molybdenum.

* * * * *